Jan. 22, 1963  J. M. MELE  3,074,678
BEER CAN HOLDER
Filed Dec. 14, 1959

JOHN M. MELE
INVENTOR.
BY J. O. Stalley
Patent Agent

United States Patent Office 3,074,678
Patented Jan. 22, 1963

3,074,678
BEER CAN HOLDER
John Michael Mele, 345 Foxon Road, East Haven, Conn.
Filed Dec. 14, 1959, Ser. No. 859,227
3 Claims. (Cl. 248—145.6)

My invention relates to holders for cans containing beverages and more particularly to beer can holders; this being an improvement of the invention described in my prior application Serial No. 686,180 filed on September 25, 1957, now abandoned.

As the pouring out of the cold beer into a glas will raise the temperature of the beer and also will reduce its gas content, it is considered preferable by many persons to drink the beer directly from the can through an opening cut in the cover of the can.

One of the important objects of my invention is to provide a convenient handle for the holding of the beer can and thereby eliminate the inconvenience of a direct contact between the fingers and the cold and moist beer can.

Another important object of my invention is to provide a beer can holder which collects the beer which may be accidentally spilled when cutting the opening in the cover of the can, thereby preventing the soiling of the table cover.

A further object of my invention is to provide a beer can holder which is very simple in construction, economical in manufacture, and which offers a very secure clamping of the beer can in the holder, eliminating the possibility of the rotation of the beer can in the holder and the resultant displacement of the discharge opening of the cover in relation with the handle.

Other objects and advantages of my invention will be apparent during the course of the following description.

Figure 1:
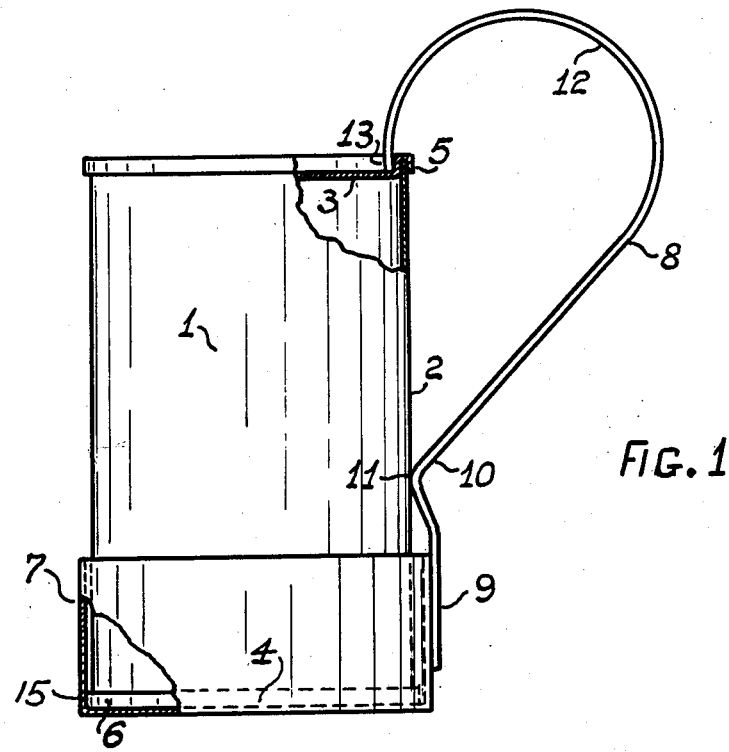
Figure 2:
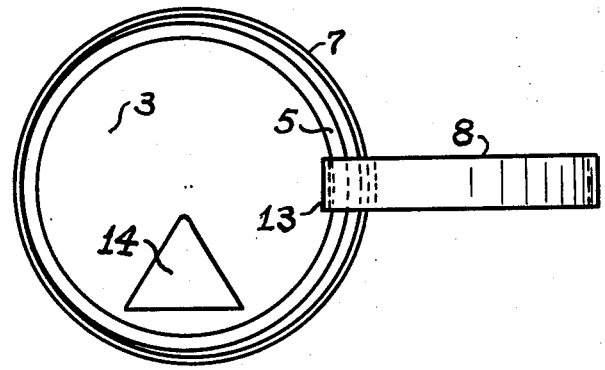

In the accompanying drawing, forming a part of this application, wherein for the purpose of illustration is shown a preferred form of my invention, FIGURE 1 is an elevational, and partly sectional, view of the preferred form of my beer can holder enclosing the beer can, FIGURE 2 is a plan view of the same.

Referring to the drawing, the numeral 1 designates the beer can, which is of the customary highly standardized construction, consisting of a cylindrical side wall 2, a circular top cover 3, and a circular base cover 4. These covers 3 and 4 are joined to the side wall 2 by the circular beads 5 and 6, respectively, the overall diameter of these beads being always larger than the overall diameter of the cylindrical side wall 2 of the can.

My beer can holder consists of only two constructional elements: the holder cup 7 and the handle 8, each performing double functions. The holder cup 7 supports the beer can 1 and also collects the beer, which may be accidentally spilled when cutting the opening in the top cover of the beer can. The handle 8, in addition to its offering a convenient means for the holding of the beer can, also accomplishes the secure clamping of the beer can in the holder. In the preferred form illustrated the holder cup 7 is a simple inexpensive stamping and the handle 8 is formed of a single resilient strip. This simplicity of construction and the resultant low manufacturing cost is an extremely important feature of this invention because of the utilization of this beer can holder as an advertising item, with free distribution by beer manufacturers.

The holder cup 7 illustrated in FIG. 1 has a circular base and cylindrical side wall, the inside diameter of which is slightly larger than the overall diameter of the base bead 6, permitting the easy insertion of the beer can 1 into the holder cup 7. As the side wall 2 of the beer can has a smaller diameter than the base bead 6, there will be always a radial clearance between the side wall of the beer can and the side wall of the holder cup to permit the easy entry of the spilled beer into the cup 7.

The handle 8, which in the preferred form illustrated is made of a resilient metallic strip, comprises a lower portion 9 which is permanently secured to the holder cup 7; an adjoining middle portion 10 so formed as to contact the side wall of the beer can at point 11 and exert by its resiliency a force on the side wall of the beer can directed inwardly toward the interior of the beer can; and an adjoining top portion 12, bent to form the handle and having its upper free end 13 so formed as to hook into the top bead 5 of the beer can producing a force by the resiliency of the handle, which can be resolved into a downwardly and an outwardly component, acting on top bead 5 at the contact point of the free end 13. Thus, the present invention has the novel and very advantageous feature that the single resilient strip, functioning as a convenient handle, exerts on the beer can simultaneously three forces: an inwardly, substantially horizontal force at point 11, an outwardly, substantially horizontal force, and also a downwardly, substantially vertical force at the free end 13 of the strip. The effect of this downwardly force will be the pressing of the beer can against the base of the holder cup 7, while the remaining two horizontal forces, acting in opposite directions at point 11 and 13, respectively, will press the base bead 6 of the beer can strongly against the interior surface of the holder cup at point 15 (see FIG. 1). As a result of these pressures the beer can will be securely clamped and the rotation of the beer can in the holder will be prevented.

This simple and effective clamping device has also the advantage of the easy insertion and removal of the beer can by means of a slight lifting of the free end 13 of the handle.

The operation of my invention is as follows:

By a slight upward bending of the handle the free end 13 is lifted sufficiently to clear the top bead 5 permitting the insertion of the beer can into the holder cup 7. After the insertion of the beer can is completed, the handle is released, permitting the free end 13 of the handle to engage the top bead 5 of the can and effect the secure clamping of the beer can. Following this, the discharge opening 14 is cut in the top cover of the beer can, as shown in FIG. 2, and the device is ready for use. The empty beer can can be removed conveniently by a slight upward bending of the handle, as described above.

The cutting of the discharge opening 14 in the top cover of the beer can is usually done by the customary beer can opener, which cuts a triangular hole (see FIG. 2). This cutting operation is sometimes accompanied by the accidental spilling of some beer. In the present invention the spilled beer flowing down on the side of the beer can is readily collected in the holder cup 7, thereby avoiding the soiling of the table cloth.

It is to be understood that the form of my invention, herein shown and described, is to be considered as a preferred example of the same, and that various changes in the shape, size, and arrangement of parts may be resorted to, without departing from the spirit of my invention or the scope of the subjoined claims.

I claim:

1. In combination a holder and a beer can having cylindrical side wall with a base bead, top cover and a top bead, comprising a holder cup, of larger internal diameter than the overall diameter of said base bead, carrying said beer can; a handle made of a single resilient strip and having a lower portion secured to said holder cup; a middle portion having a contact point with the side wall of said beer can and exerting an inwardly directed force on the side wall of said beer can; and a top portion so formed as to have its free end resting on said top cover and engaging said top bead of the beer can, exerting a downwardly and an outwardly directed force on said top cover and bead, thereby securing said beer can effectively to said holder cup.

2. In combination a holder and a beer can having a cylindrical side wall with a top cover and a top bead, comprising a holder cup surrounding the lower portion of the beer can; a resilient handle, composed of a lower portion secured to said holder cup; a middle portion, adjoining said lower portion, and bent to form a contact point exerting by resiliency on the side wall of the beer can a force directed inwardly toward the interior of said beer can; and a top portion, adjoining said middle portion, and being so formed as to have its free end resting on said top cover and engaging said top bead of the beer can, exerting a force on said top cover and bead directed outwardly, away from the interior of said beer can, and also downwardly, toward said holder cup, thereby securing said beer can effectively to said holder cup.

3. In combination a holder and a beer can having a side wall with a top cover and a top bead, comprising a holder cup carrying said beer can; a resilient strip, forming a handle, and having its lower portion secured to said cup, also having the free end of its top portion resting on said top cover and engaging said top bead, exerting a downwardly and outwardly directed force on said top cover and top bead, and its middle portion bent to contact said side wall of said can exerting on it an inwardly directed force, thereby securing said beer can effectively to said holder cup.

References Cited in the file of this patent
UNITED STATES PATENTS

| | | |
|---|---|---|
| 894,725 | Cooper | July 28, 1908 |
| 2,128,466 | Machotka | Aug. 30, 1938 |
| 2,784,578 | Southwick | Mar. 12, 1957 |
| 2,806,732 | Montanaro | Sept. 17, 1957 |
| 2,813,742 | Neugebauer | Nov. 19, 1957 |

FOREIGN PATENTS

| | | |
|---|---|---|
| 761,396 | France | Jan. 5, 1934 |